United States Patent
Xiang et al.

(10) Patent No.: US 10,602,265 B2
(45) Date of Patent: Mar. 24, 2020

(54) COPRIME MICROPHONE ARRAY SYSTEM

(71) Applicant: Rensselaer Polytechnic Institute, Troy, NY (US)

(72) Inventors: Ning Xiang, Cohoes, NY (US); Dane Bush, Troy, NY (US)

(73) Assignee: Rensselaer Polytechnic Institute, Troy, NY (US)

(*) Notice: Subject to any disclaimer, the term of this patent is extended or adjusted under 35 U.S.C. 154(b) by 0 days.

(21) Appl. No.: 15/561,411

(22) PCT Filed: May 4, 2016

(86) PCT No.: PCT/US2016/030650
§ 371 (c)(1),
(2) Date: Sep. 25, 2017

(87) PCT Pub. No.: WO2016/179211
PCT Pub. Date: Nov. 10, 2016

(65) Prior Publication Data
US 2018/0109873 A1    Apr. 19, 2018

Related U.S. Application Data

(60) Provisional application No. 62/156,522, filed on May 4, 2015.

(51) Int. Cl.
| | |
|---|---|
| *H04R 1/40* | (2006.01) |
| *G01S 3/801* | (2006.01) |
| *G01S 3/808* | (2006.01) |
| *H04R 3/00* | (2006.01) |

(52) U.S. Cl.
CPC .............. *H04R 1/406* (2013.01); *G01S 3/801* (2013.01); *G01S 3/8083* (2013.01); *H04R 3/005* (2013.01); *H04R 2201/401* (2013.01); *H04R 2201/403* (2013.01); *H04R 2201/405* (2013.01); *H04R 2203/12* (2013.01)

(58) Field of Classification Search
None
See application file for complete search history.

(56) References Cited

U.S. PATENT DOCUMENTS

| | | | | |
|---|---|---|---|---|
| 5,657,393 | A | * | 8/1997 | Crow ..................... H04R 3/005 367/123 |
| 6,987,707 | B2 | | 1/2006 | Feintuch et al. |
| 6,999,593 | B2 | | 2/2006 | Rui et al. |
| 7,415,117 | B2 | | 9/2008 | Tashev et al. |
| 8,098,842 | B2 | | 1/2012 | Florencio et al. |
| 8,477,970 | B2 | | 7/2013 | Strub |

(Continued)

OTHER PUBLICATIONS

Adhikari et al, "Beamforming with extended co-prime sensor arrays." pp. 1-4. 2013.*

(Continued)

*Primary Examiner* — Qin Zhu
(74) *Attorney, Agent, or Firm* — Murtha Cullina LLP

(57) ABSTRACT

A coprime microphone array (CMA) system, comprising: a CMA arrangement that includes a pair of uniform linear microphone subarrays that are coincident and have a coprime number of microphones; a computing system that processing signals from each microphone in the CMA arrangement and generates sound localization information.

13 Claims, 4 Drawing Sheets

(56) References Cited

U.S. PATENT DOCUMENTS

| | | | | |
|---|---|---|---|---|
| 2002/0097885 | A1* | 7/2002 | Birchfield | H04R 1/406 381/92 |
| 2004/0032487 | A1* | 2/2004 | Chu | G01S 5/18 348/14.09 |
| 2004/0252845 | A1* | 12/2004 | Tashev | G01S 3/8034 381/56 |
| 2005/0225497 | A1* | 10/2005 | Christensen | H01Q 3/26 343/893 |
| 2005/0271221 | A1* | 12/2005 | Cerwin | H04R 1/406 381/92 |
| 2006/0245601 | A1 | 11/2006 | Michaud et al. | |
| 2006/0253282 | A1* | 11/2006 | Schmidt | G07C 5/0808 704/233 |
| 2007/0127736 | A1* | 6/2007 | Christoph | H04R 1/406 381/92 |
| 2011/0038229 | A1* | 2/2011 | Beaucoup | G01S 3/8083 367/119 |
| 2013/0343558 | A1* | 12/2013 | Fox | H04R 3/002 381/71.14 |
| 2014/0153740 | A1* | 6/2014 | Wolff | H04R 3/005 381/92 |
| 2014/0172435 | A1 | 6/2014 | Thiergart et al. | |
| 2015/0016628 | A1 | 1/2015 | Li | |

OTHER PUBLICATIONS

International Search Report and Written Opinion dated Aug. 9, 2016 for PCT/US2016/030650 filed May 4, 2016; pp. 13.

* cited by examiner

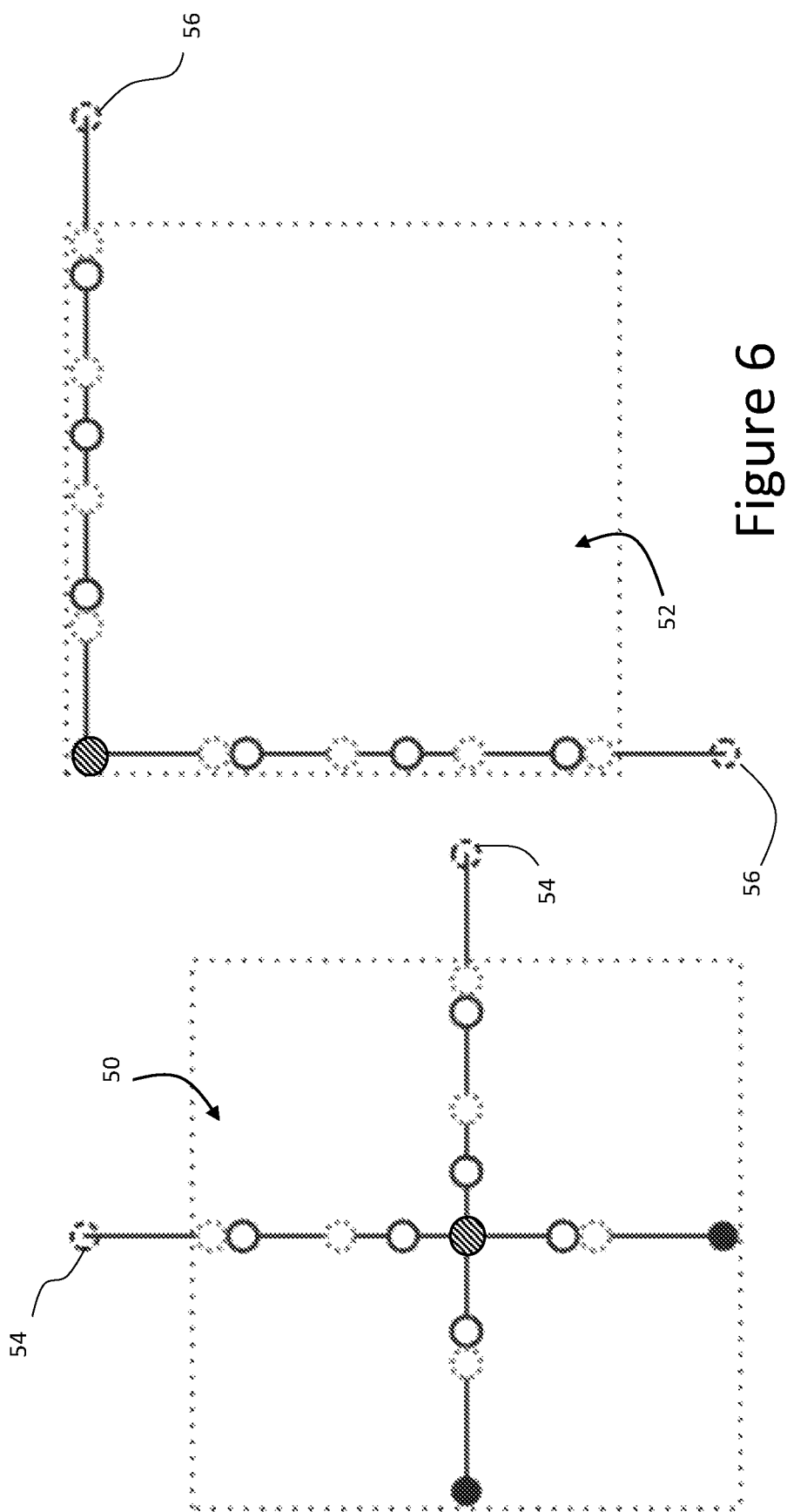

COPRIME MICROPHONE ARRAY SYSTEM

CROSS-REFERENCE TO RELATED APPLICATIONS

This application claims priority to U.S. provisional patent application "Three-dimensional sparse microphone array for direction of arrival and tracking," Ser. No. 62/156,522, filed on May 4, 2015, the contents of which are hereby incorporated by reference.

TECHNICAL FIELD

The subject matter of this invention relates to microphone arrays for acoustic applications, and more particularly relates to linear coprime microphone arrays for sound source localization.

BACKGROUND

Microphone arrays are used in a wide variety of situations for many acoustic applications, including passive-sonar localization, spatial-audio recording, isolation of a desired signal from noise and reverberation, and locating sound sources. For example, acoustic source localization based on microphone array signal processing can be used to locate gunfire or aircraft in defense and homeland-security applications, to localize noise sources in the design and manufacturing process of machines, to identify a speaker in room of people, or to localize an unknown number of spatially distributed sound sources in spatially distributed noise.

All such applications generally require microphone array designs and beamforming techniques that can produce narrow beams to help identify an angular direction of a sound source. In general, accuracy of source localization and array gain improve by increasing the number of array elements. Thus, while there are numerous proposed approaches with respect to sound localization, most require an extremely large number of microphones in the array to collect the necessary acoustic information to localize sound sources. This leads to high implementation costs and significant computational requirements. Accordingly, a need exists for microphone array designs that can provide highly focused beams with a minimum number of microphones in the array.

SUMMARY

Described herein are solutions for implementing coprime microphone arrays that can use significantly fewer microphones and computational resources to achieve similar performance to that of traditional densely populated microphone arrays.

In a first aspect, the disclosure provides a coprime microphone array (CMA) system, comprising: a CMA arrangement that includes a pair of uniform linear microphone subarrays that are coincident and have a coprime number of microphones; a computing system that processes signals from each microphone in the CMA arrangement and generates sound localization information.

In a second aspect, the disclosure provides a two dimensional (2D) coprime microphone array (CMA) system, comprising: a first CMA arrangement that includes a first pair of uniform linear microphone subarrays that are coincident and have a coprime number of microphones; and a second CMA arrangement that includes a second pair of uniform linear microphone subarrays that are coincident and have a coprime number of microphones; wherein the first CMA arrangement is arranged perpendicularly to second CMA arrangement to provide sound localization along two orthogonal spatial axes.

In a third aspect, the disclosure provides a system, comprising: a coprime microphone array (CMA) arrangement that includes a pair of uniform linear microphone subarrays that are coincident and have a coprime number of microphones; a computing system that processes signals from each microphone in the CMA arrangement and generates sound localization information; and a device that utilizes sound localization information to provide at least one of an analysis output and a reaction output.

BRIEF DESCRIPTION OF THE DRAWINGS

These and other features of this invention will be more readily understood from the following detailed description of the various aspects of the invention taken in conjunction with the accompanying drawings in which:

FIG. 5 depicts a two dimensional CMA arrangement according to embodiments.

FIG. 6 depicts a two dimensional CMA arrangement according to embodiments.

Figure 1:
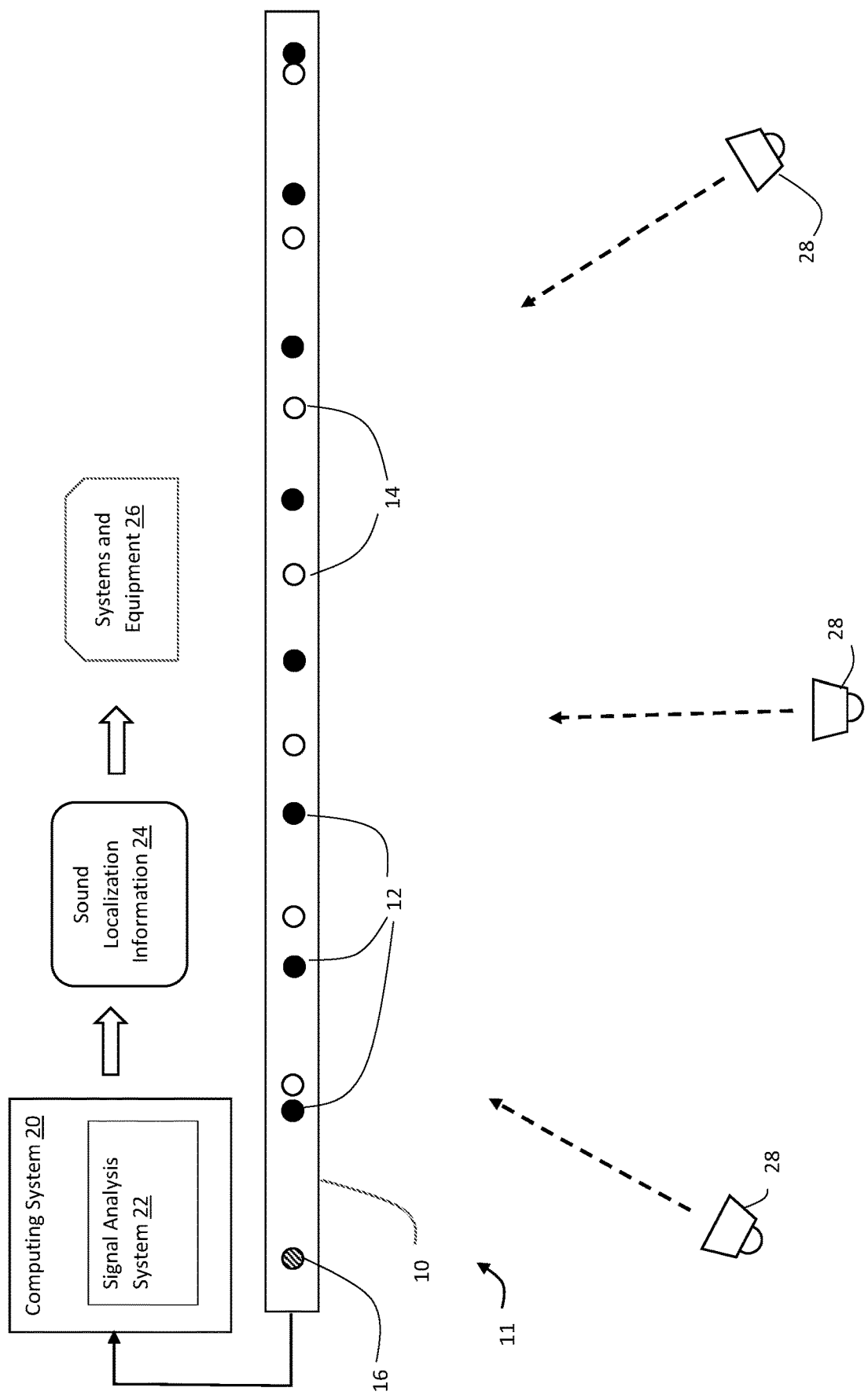
FIG. 1 depicts a CMA system according to embodiments.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Described herein are coprime microphone array (CMA) systems for capturing and processing sound based signals, including acoustic airborne sounds, ultrasound signals, etc. Described embodiments include systems that provide sound localization, i.e., the ability to locate a sound source in a space. When utilized for sound localization, CMAs require significantly fewer microphones and computational resources relative to a densely populated microphone array. In particular, a CMA system can match the performance of a traditional M×N microphone array with no more than M+N−1 microphones.

An example of a CMA system 11 is shown in FIG. 1, which generally includes a CMA arrangement 10 and computing system 20. Coprime numbers are two numbers that have no common dividers other than 1. CMA arrangement 10 is implemented with two uniform linear microphone subarrays 12, 14, that are coincident (i.e., both have the same starting point and both continue in the same direction), and have a coprime number of microphones. Microphones in each subarray 12, 14 are uniformly spaced and in this case, have M=9 and N=8 microphones respectively. It is understood that the number of microphones in subarrays 12, 14 could be any pair of coprime numbers. Effectiveness of the CMA arrangement 10 is however maximized when the coprime pair of number are close together (e.g., 8/9, 4/5, 11/12, etc.).

In this example, there are nine equally spaced microphones in the first subarray 12, M=9 (shown as black filled circles), and eight equally spaced microphones in the second subarray 14, N=8 (shown as white filled circles). As can be seen, the two subarrays 12, 14 share the same first microphone 16. Thus, the number of microphones in this arrangement is M+N−1=16. To achieve the same performance, a traditional array would require M×N=72 microphones.

Microphones may be mounted on any assembly capable of maintaining their spatial positioning, e.g., a metal, wooden, or plastic structure. Spacing, length and number of microphones in the CMA arrangement 10 will depend upon the particular application. Generally, spacing of the microphones in each subarray may be determined based on a wavelength of interest.

The coprime array design frequency f is given by f=cMN/2L, where c is the speed of sound and L is the length of the CMA arrangement 10. Accordingly, the spacing or distance d between microphones may be determined as $d_M = N\lambda/2$, and $d_N = M\lambda/2$, where $\lambda$ is the wavelength of interest. If the aperture length L is the same for both subarrays, then the separation for M is $d_M = L/M$ and the separation for N is $d_N = L/N$. Given this, in the case where a design frequency of 12.35 kHz is contemplated, coprime numbers of M=9 and N=8 may be implemented with a spacing $d_M$ of about 1.39 cm apart.

CMA arrangement 10 has a number of advantages over randomly distributed sparse arrays because the microphone locations are easily determined, requiring no exhaustive searches, and the outputs of the two subarrays can be combined in a unique way due to the coprimality of the subarrays. The coprime arrays with appropriate signal processing can achieve higher resolution than is classically possible by the Rayleigh limit, allowing for accurate direction-of-arrival (DOA) estimation with a drastically reduced number of microphones.

Computing system 20 receives signals from the CMA arrangement 10 and utilizes signal analysis system 22 to analyze the signals to create sound localization information 24. Sound localization information 24 may for example include angular and/or other spatial data indicating a direction in which sound sources 28 are located. Sound localization information 24 may also be output as a stream of information continuously calculated over time. Sound localization information may also be stored for further processing, displayed in the form of beam patterns, or used dynamically to control a further device or process.

Signal analysis system 22 may for example be implemented in software, hardware, or a combination of the two; and may use any now known or later developed algorithm for reading the M+N−1 microphone signals, processing the signals, and determining and outputting sound localization information 24. Processing of the signals may include time-domain processing techniques and/or frequency-domain processing techniques.

For example, the known technique of delay-and-sum processing may be utilized, which essentially turns the array into discrete shifts and a root mean square (rms) value at each angle is then captured. A directional response can be made showing the normalized pressure amplitude in each azimuthal direction.

Because beam patterns are frequency-dependent, the windowed signals can be filtered to a narrow band of frequencies at the start of processing. The set of microphone channels receiving signals from the CMA arrangement 10 (e.g., 16 in this case) are split into M and N channels (with the first channel being identical for each). Then within the subarrays, the delay-and-sum operation is performed with different delays corresponding to different angles of interest (i.e., angular bands). The number of angular bands can be increased continuously, limited only by sample frequency.

After delay-and-sum processing, the directional signals from each subarray are combined via point-by-point multiplication to get the coprime signal in that angular band. The root mean square (rms) value of the coprime signal may be represented at the corresponding angle on a polar diagram to produce the coprime directional response. The process is repeated for as many angles as desired in order to form a complete semicircular pattern with sufficient finite resolution.

Using boldface vector notation for time-domain data, the signals from the array elements in each subarray are processed as follows to acquire the combined coprime signal.

$$h_{coprime}(\theta) = \sqrt{\sum_{m=0}^{M-1} h_m e^{-j\alpha m} \times \sum_{n=0}^{N-1} h_n e^{-j\alpha n}},$$

where $\alpha(\theta) = 2\pi d \sin \theta / 2\lambda$,

The beam pattern is simply the Euclidean norm of the coprime signal, h, as a function of angle, $\theta$, $\Gamma(\theta) = |h(\theta)|$.

Using fixed spatial beamforming, when the signals from all elements in a subarray are added with no delays, that subarray's beam faces forward; multiplying the two subarrays' outputs provides a forward facing coprime beam. By changing the physical orientation of the array with respect to a fixed source, the sensitivity can be recorded for each angle. These magnitudes are then normalized and presented on a polar diagram to show the coprime array's fixed beam pattern.

Computing system 20 may further be coupled to other specialized systems and equipment 26 to that generally either use the sound location information perform analysis or create a reaction. For example, a reaction may include: causing audio/video equipment, such as an image collector, to re-orient and zoom in on a person speaking during a video conference; causing military counter-measures to be initiated; causing a robot to move, etc. Analysis many include evaluating sounds: in a wind tunnel to evaluate structures contained therein; in a battle zone to localize arms fire; in machinery to detect failures, etc.

Figure 2:
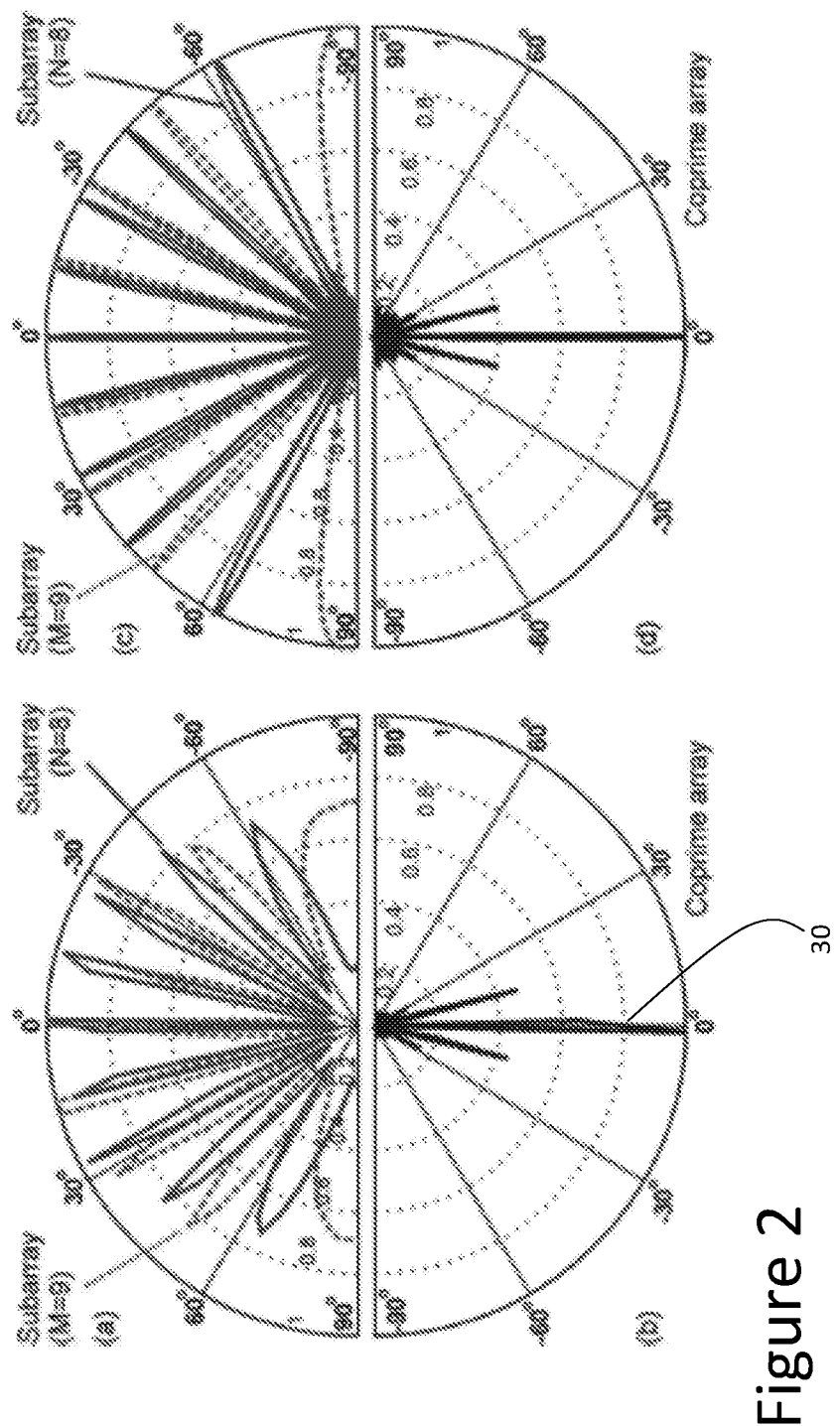
FIG. 2 depicts polar graphs showing CMA results according to embodiments.

FIG. 2 depicts a comparison between predicted and experimentally measured beam patterns of the CMA arrangement 10 with coprime numbers M=9 and N=8 for normal incident waves. The left patterns show experimentally measured beam patterns of the subarrays (top) and resulting coprime array (bottom). The right patterns show predicted beam patterns of the subarrays (top) and resulting coprime array (bottom). As can be seen, the grating lobes of each subarray (shown on the top patterns) are mostly cancelled when signals from the subarrays M and N are multiplied together, except in the one shared direction where a main beam 30 of the overall CMA arrangement is formed. As shown, very narrow beam patterns (e.g., main beam pattern 30) can be created with just 16 microphones. It is also noted that the upper limit frequency is determined by the coprime number of microphones, whereas the beam width is dependent upon wavelength and the aperture length L. Accordingly, the beam width of both subarrays are the same, meaning that the beam width of an M+N−1 CMA is the same as an M×N array.

Figure 3:
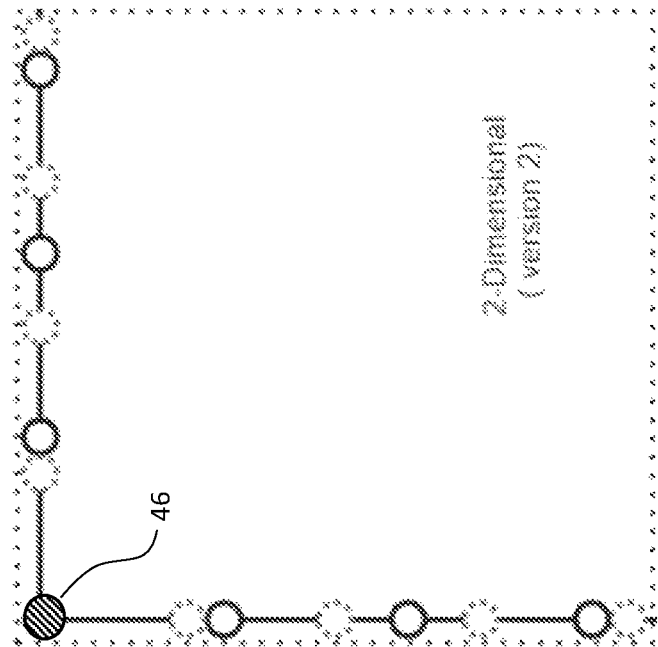
FIG. 3 depicts a two dimensional CMA arrangement according to embodiments.
Figure 4:
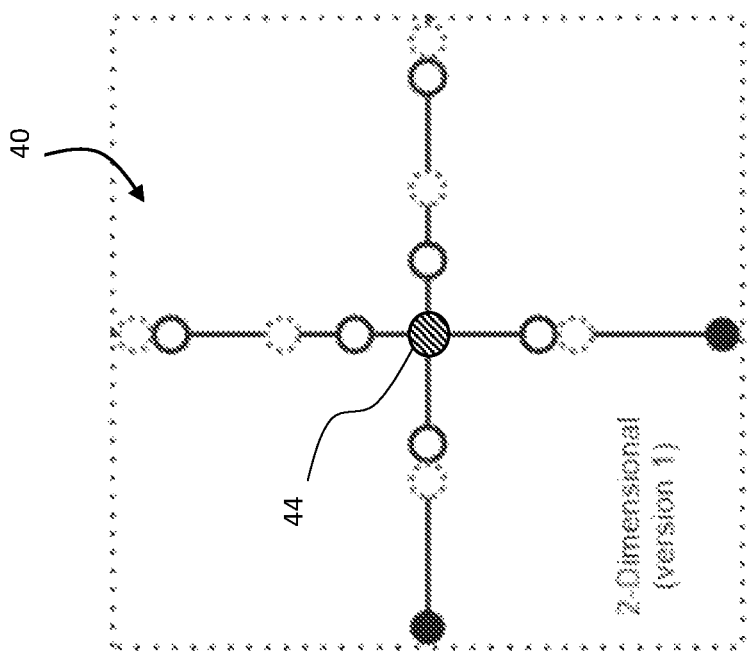
FIG. 4 depicts a two dimensional CMA arrangement according to embodiments.

FIGS. 3 and 4 depict different versions of two dimensional (2D) CMA structures. Each version includes two M=5, N=4 CMA perpendicular arrangements 40, 42. FIG. 3 depicts a crossing pattern arrangement 40, and FIG. 4 depicts an "L-shaped" pattern arrangement 42. The perpendicular arrangements 40, 42 allow for sound source location along two orthogonal spatial axes. For example, using a perpendicular arrangement 40, 42, localization of people speaking in an amphitheater can be detected both the left-right and up-down directions. Further, the two dimensional arrangements allow for the sharing of an additional common microphone 44, 46, respectively, among the microphones in each perpendicular arrangement. Thus, in this example, only 15 microphones are required to implement each perpendicular arrangement 40, 42.

FIGS. 5 and 6 depict two additional 2D CMA structures. In this case, both versions include two M=6, N=5 perpendicular arrangements 50, 52. In this case, each M=6, N=5 coprime array not only shares the beginning microphone (shown in black), but also shares the ending microphone 54, 56. This thus allows for the further reduction of microphones, in this case 17 total microphones are required for each arrangement 50, 52.

The described embodiments provide beamforming solutions using a sparely populated CMA that provides significantly sharp sensing selectivity using a significantly smaller number of microphones. A sharp sensing beam can be steered in high spatial resolution in terms of signal processing without physically moving the array, which can be used to track sound localization in noisy and/or reverberant environment.

Computing system 20 of FIG. 1 may be implemented in hardware, software or a combination thereof. Hardware may be implemented with special purpose devices to carry out the functions described herein. Software may be implemented as a computer program product stored on a computer readable storage medium. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

An illustrative computing system 20 may comprise any type of computing device and, and for example includes at least one processor, memory, an input/output (I/O) (e.g., one or more I/O interfaces and/or devices), and a communications pathway. In general, processor(s) execute program code which is at least partially fixed in memory. While executing program code, processor(s) can process data, which can result in reading and/or writing transformed data from/to memory and/or I/O for further processing. The pathway provides a communications link between each of the components in computing system 20. I/O can comprise one or more human I/O devices, which enable a user to interact with computing system 20.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

The invention claimed is:

1. A two dimensional (2D) coprime microphone array (CMA) system, comprising:
   a first CMA arrangement that includes a first pair of uniform linear microphone subarrays that are coincident and have a coprime number of microphones; and
   a second CMA arrangement that includes a second pair of uniform linear microphone subarrays that are coincident and have a coprime number of microphones;
   wherein the first CMA arrangement is arranged perpendicularly to the second CMA arrangement to provide sound localization information along two orthogonal spatial axes.

2. The 2D CMA of claim 1, wherein the first CMA arrangement and second CMA arrangement share a common microphone.

3. The 2D CMA of claim 2, wherein the first CMA arrangement and second CMA arrangement form a cross pattern.

4. The 2D CMA of claim 2, wherein the first CMA arrangement and second CMA arrangement form an L-shaped pattern.

5. The 2D CMA of claim 1, further comprising a computing system that processes signals from each microphone in the first and second CMA arrangements and generates sound localization information.

6. A system, comprising:
   a first coprime microphone array (CMA) arrangement that includes a first pair of uniform linear microphone subarrays that are coincident and have a coprime number of microphones; and a second CMA arrangement that includes a second pair of uniform linear microphone subarrays that are coincident and have a coprime number of microphones;

a computing system that processes signals from each microphone in the first CMA arrangement and the second CMA arrangement and generates sound localization information; and a device that utilizes sound localization information to provide at least one of an analysis output and a reaction output.

7. The system of claim 6, wherein the analysis output comprises at least one of a failure analysis and structural analysis.

8. The system of claim 6, wherein the reaction output includes pointing an imaging device toward a sound source.

9. The system of claim 6, wherein the first CMA arrangement is arranged perpendicularly to the second CMA arrangement to provide the sound localization information along two orthogonal spatial axes.

10. The 2D CMA of claim 1, wherein the coprime number of microphones in the first pair of uniform linear microphone subarrays differ by one.

11. The 2D CMA of claim 1, wherein the coprime number of microphones in the second pair of uniform linear microphone subarrays differ by one.

12. The 2D CMA of claim 5, wherein the computing system employs delay and sum processing to generate the sound localization information.

13. The 2D CMA of claim 5, wherein the computing system employs fixed spatial beamforming to generate the sound localization information.

* * * * *